United States Patent
Ichikawa et al.

(10) Patent No.: US 10,852,770 B2
(45) Date of Patent: Dec. 1, 2020

(54) ELECTRONIC DEVICE HAVING A WATERPROOF STRUCTURE

(71) Applicant: CASIO COMPUTER CO., LTD., Tokyo (JP)

(72) Inventors: Kenzo Ichikawa, Kokubunji (JP); Toshiya Kuno, Hamura (JP); Hiroyuki Fujiwara, Hanno (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/991,407

(22) Filed: May 29, 2018

(65) Prior Publication Data

US 2018/0356861 A1 Dec. 13, 2018

(30) Foreign Application Priority Data

Jun. 9, 2017 (JP) ................................. 2017-113975
Oct. 31, 2017 (JP) ................................. 2017-209959

(51) Int. Cl.
| | |
|---|---|
| *G06F 1/16* | (2006.01) |
| *G04G 17/08* | (2006.01) |
| *G04B 47/06* | (2006.01) |
| *G06F 1/3234* | (2019.01) |
| *G04G 21/02* | (2010.01) |
| *G06F 1/3215* | (2019.01) |

(52) U.S. Cl.
CPC ......... *G06F 1/1656* (2013.01); *G04B 47/066* (2013.01); *G04G 17/08* (2013.01); *G04G 21/02* (2013.01); *G06F 1/1626* (2013.01); *G06F 1/1688* (2013.01); *G06F 1/1694* (2013.01); *G06F 1/325* (2013.01); *G06F 1/3215* (2013.01); *G06F 1/163* (2013.01)

(58) Field of Classification Search
CPC ......... G06F 1/1656; G06F 1/163; H04M 1/18
See application file for complete search history.

(56) References Cited

U.S. PATENT DOCUMENTS

| | | | |
|---|---|---|---|
| 9,518,890 B2 * | 12/2016 | Aotake | ................... H04M 1/18 |
| 10,261,616 B2 * | 4/2019 | Jeong | ................... H01L 27/323 |
| 2015/0195927 A1 * | 7/2015 | Lee | ..................... H05K 5/0247 |
| | | | 361/749 |

(Continued)

FOREIGN PATENT DOCUMENTS

| | | |
|---|---|---|
| JP | 2004-159181 A | 6/2004 |
| JP | 2011-214833 A | 10/2011 |
| JP | 2015-053606 A | 3/2015 |

OTHER PUBLICATIONS

Notice of Reasons for Refusal dated Aug. 6, 2019 in Japanese Patent Application No. 2017-209959.

*Primary Examiner* — James Wu
*Assistant Examiner* — Christopher L Augustin
(74) *Attorney, Agent, or Firm* — Scully Scott Murphy & Presser

(57) ABSTRACT

An electronic device having a waterproof structure includes a housing having a sound hole waterproofed by a waterproof membrane; a barometer which is arranged in the housing, determines data variable in response to a state of the waterproof membrane, and outputs the determined data; and a central controller which detects an abnormal state of the waterproof membrane based on atmospheric pressure data outputted from the barometer.

13 Claims, 8 Drawing Sheets

(56) References Cited

U.S. PATENT DOCUMENTS

| | | | |
|---|---|---|---|
| 2015/0334479 A1* | 11/2015 | Huey | H04R 1/02 |
| | | | 181/199 |
| 2016/0058375 A1* | 3/2016 | Rothkopf | G06F 1/1643 |
| | | | 600/301 |
| 2016/0116443 A1 | 4/2016 | Choi et al. | |
| 2016/0146935 A1* | 5/2016 | Lee | G01S 15/02 |
| | | | 367/87 |
| 2016/0284192 A1* | 9/2016 | Moriai | G08B 21/18 |
| 2016/0306399 A1* | 10/2016 | Koppal | G06F 1/182 |
| 2016/0309604 A1* | 10/2016 | Steijner | E06B 7/22 |
| 2017/0035156 A1* | 2/2017 | Wright | A45C 13/008 |
| 2017/0051769 A1* | 2/2017 | Hilario | G04G 17/08 |

\* cited by examiner

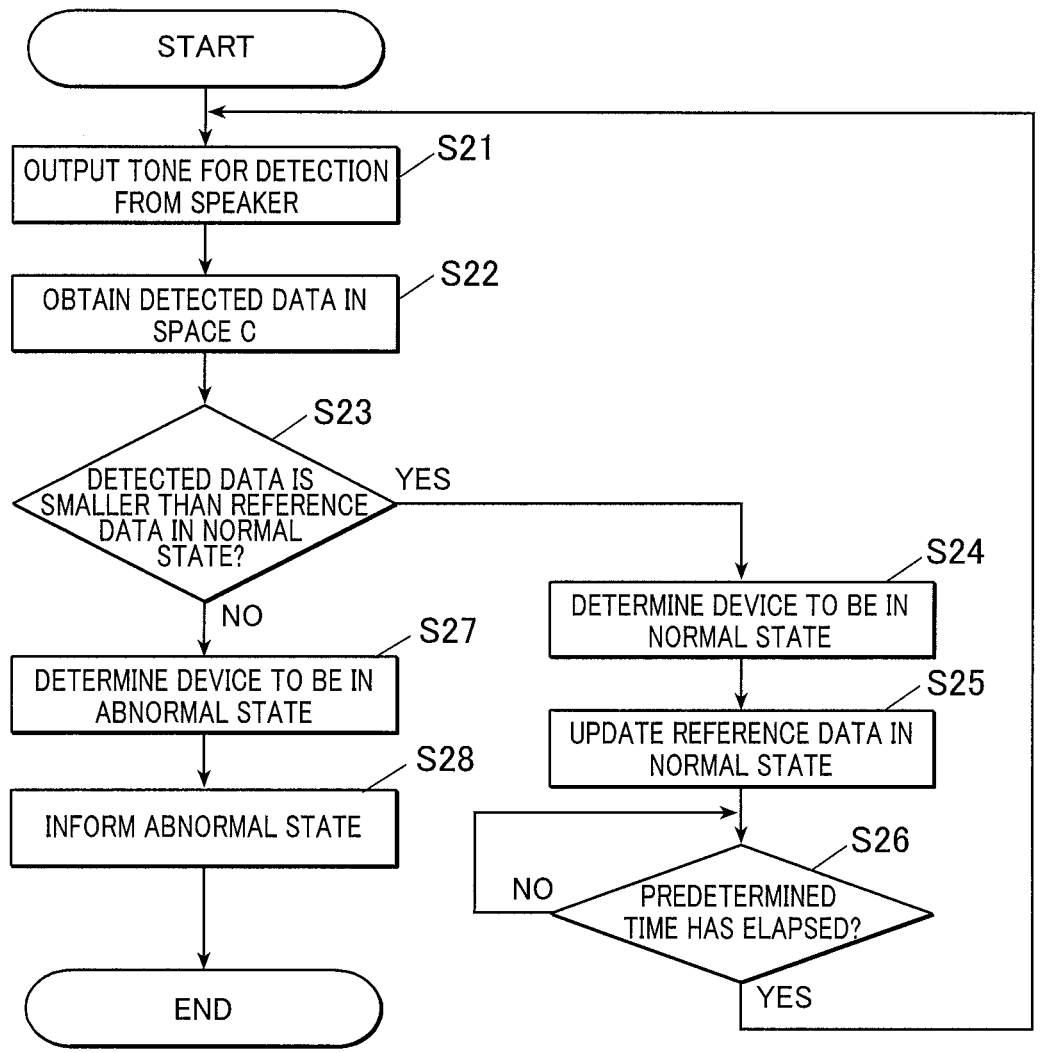

ELECTRONIC DEVICE HAVING A WATERPROOF STRUCTURE

This application claims priority to Japanese Patent Application No. 2017-113975, filed on Jun. 9, 2017, and Japanese Patent Application No. 2017-209959, filed on Oct. 31, 2017. The contents of Japanese Patent Application No. 2017-113975 and Japanese Patent Application No. 2017-209959 are incorporated by reference herein in its entirety.

The present invention relates to an electronic device having a waterproof structure.

Electronic devices are known that includes motion sensors such as GPS functions and acceleration sensors. Such electronic devices are added onto wearable devices such as smart watches, and thereby can acquire positional information about the wearable devices and then feed the information back to users.

Some electronic devices provide various notifications to users through a sound outputted from speakers. Such electronic devices should be provided with waterproofed sound holes to prevent damage by water. Japanese Patent Application Publication No. 2004-159181 discloses a waterproofed acoustic device such as a speaker and a microphone.

An electronic device according to an aspect of the present invention comprises: a housing having an opening, the opening having a structure to be waterproofed with a waterproof member; a data output unit arranged in the housing, wherein the data output unit detects a change depending on a state of the waterproof member and outputs data caused by the detection; a processor, and a storage unit which stores a program to be executed by the processor. The processor performs, in accordance with the program stored in the storage unit, a state detection process for detecting an abnormal state of the waterproof member based on the data outputted by the data output unit.

BRIEF DESCRIPTION OF THE DRAWINGS

FIG. 11 is a flow chart illustrating an example operation of the electronic device detecting a change in the state of the subunit according to the second embodiment.

DETAILED DESCRIPTION OF THE PREFERRED EMBODIMENTS

First Embodiment

[Configuration of Electronic Device]

An electronic device 100 according to a first embodiment will now be described.

The following embodiments would be provided with technically-preferred various limitations for accomplishing the present invention. The scope of the invention, however, should not be limited to the embodiments and drawings.

Figure 1:
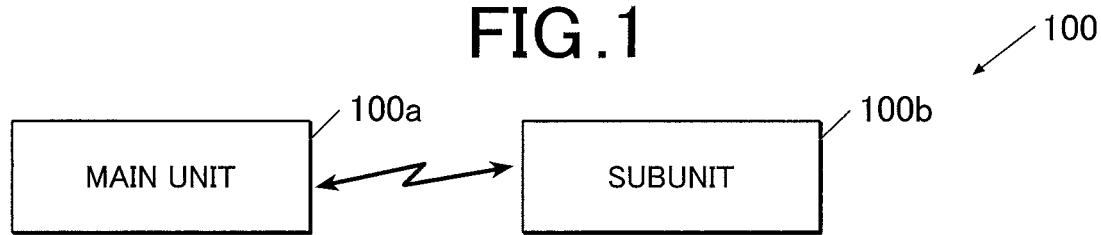
FIG. 1 illustrates an electronic device according to a first embodiment of the present invention.

FIG. 1 illustrates a configuration of an electronic device 100 according to the present invention.

With reference to FIG. 1, the electronic device 100 includes a main unit 100a and a subunit 100b. The main unit 100a is an external information terminal, such as a smart phone. The main unit 100a is in wireless communication with the subunit 100b. The main unit 100a may be integrated with the subunit 100b as in a wearable activity tracker.

Figure 2A:
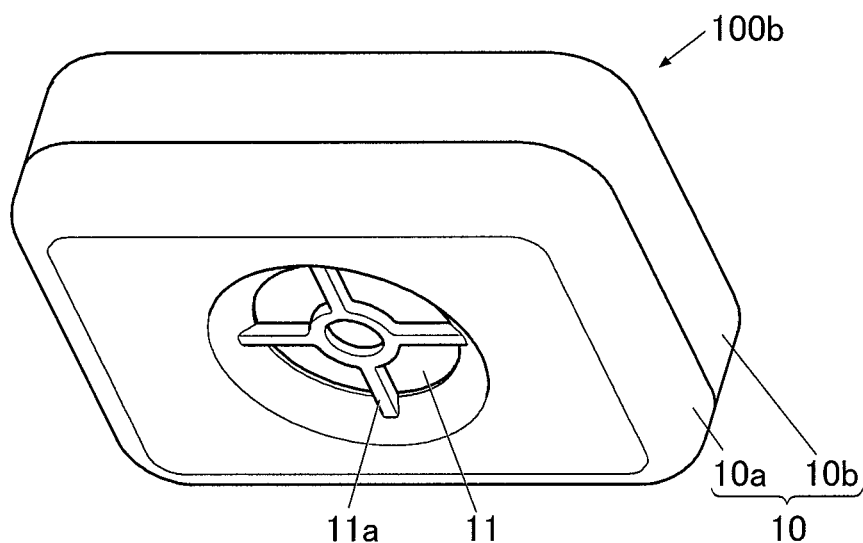
FIG. 2A is a perspective view of a configuration of a subunit according to the first embodiment.
Figure 2B:
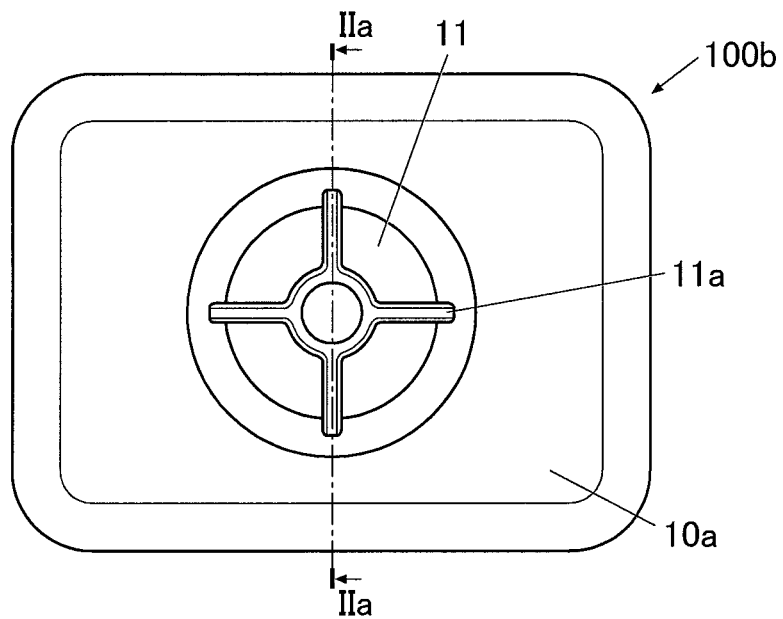
FIG. 2B is a front view of the configuration the subunit according to the first embodiment.

FIG. 2A is a perspective view and FIG. 2B is a front view of an exterior of the subunit 100b.

Figure 3A:
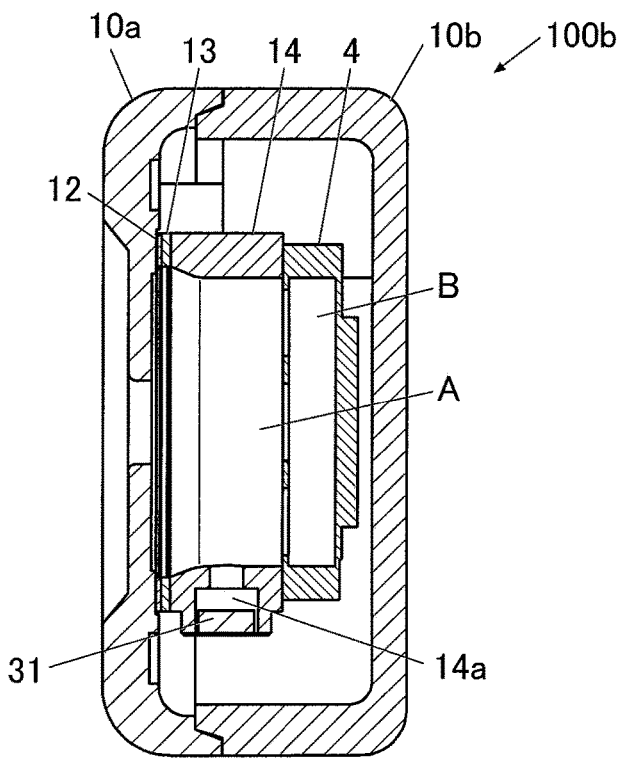
FIG. 3A is a cross-sectional view of the assembled subunit according to the first embodiment.
Figure 3B:
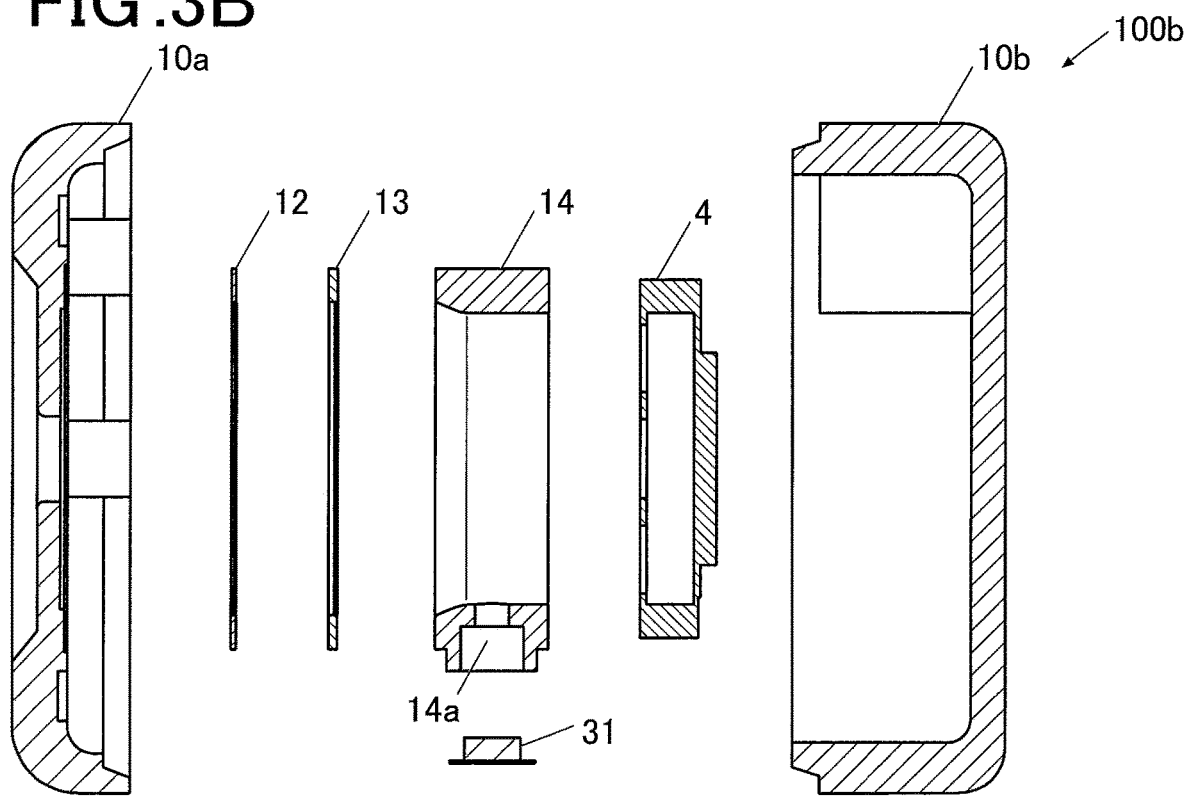
FIG. 3b is an exploded cross-sectional view of the disassembled subunit according to the first embodiment.

FIGS. 3A and 3B are cross-sectional views of the subunit 100b taken along line IIa-IIa in FIG. 2B. FIG. 3A illustrates the assembled state of the subunit 100b. FIG. 3B illustrates a disassembled state of the subunit 100b.

The subunit 100b includes a housing 10 including a front member 10a and a rear member 10b, and an opening or sound hole 11, arranged at the front member 10a, which emits a tone generated by a speaker 4 to the exterior. A protective member 11a is arranged in the sound hole 11 to protect each component arranged in the housing 10.

The housing 10 accommodates a net 12, a waterproof membrane 13, a spacer 14, and a speaker 4, in this order from a side of the front member 10a. These components are fixed with a double-sided tape or an adhesive agent that ensures waterproofness and airtightness. The front member 10a is fixed to the rear member 10b with one or more screws (not shown).

The net 12 has a substantially circular peripheral shape conforming with the outer diameter of the sound hole 11. The net 12 is bonded to the wall of the front member 10a so as to cover the sound hole 11 and prevent intrusion of foreign substances to the interior of the housing 10.

The waterproof membrane 13 has a substantially circular peripheral shape conforming with the outer diameter of the sound hole 11. The waterproof membrane 13 has low water absorption and is impermeable to water, and thus functions as a waterproof member ensuring the waterproofness of the housing 10. The waterproof membrane 13 is composed of, for example, a highly rigid and sound conducting membrane that readily transmits vibrations. The waterproof membrane 13 vibrates in response to vibrations of air caused by the tone from the speaker 4, as described below.

The spacer 14 has a cylindrical shape and its face adjacent to the waterproof membrane 13 has a shape conforming with the outer diameter of the sound hole 11. The spacer 14 defines a space A between the waterproof membrane 13 and the diaphragm of the speaker 4.

The speaker 4 includes a diaphragm that faces the sound hole 11 and outputs a tone to the sound hole 11.

The speaker 4 functions as a sound outputting means.

The wall of the spacer 14 has a cavity 14a that accommodates a barometer 31. The barometer 31 includes a flexible printed circuit board (FPC). The barometer 31 is fixed to the wall of the spacer 14 with a double-sided tape or an adhesive agent that ensures airtightness.

Specifically, the barometer 31 determines the atmospheric pressure in the space A, which is a semi-enclosed space, and thus is not affected by a variation in the atmospheric pressure in the closed space B in the housing 10 defined by the inner wall of the housing 10, the speaker 4, and the spacer 14. Thus, even if the housing 10 deforms due to, for example, a load applied to the subunit 100b, the barometer 31 is not affected and can accurately measure the external pressure.

The barometer 31 functions as an atmospheric-pressure detecting means and a data outputting means.

Figure 4:
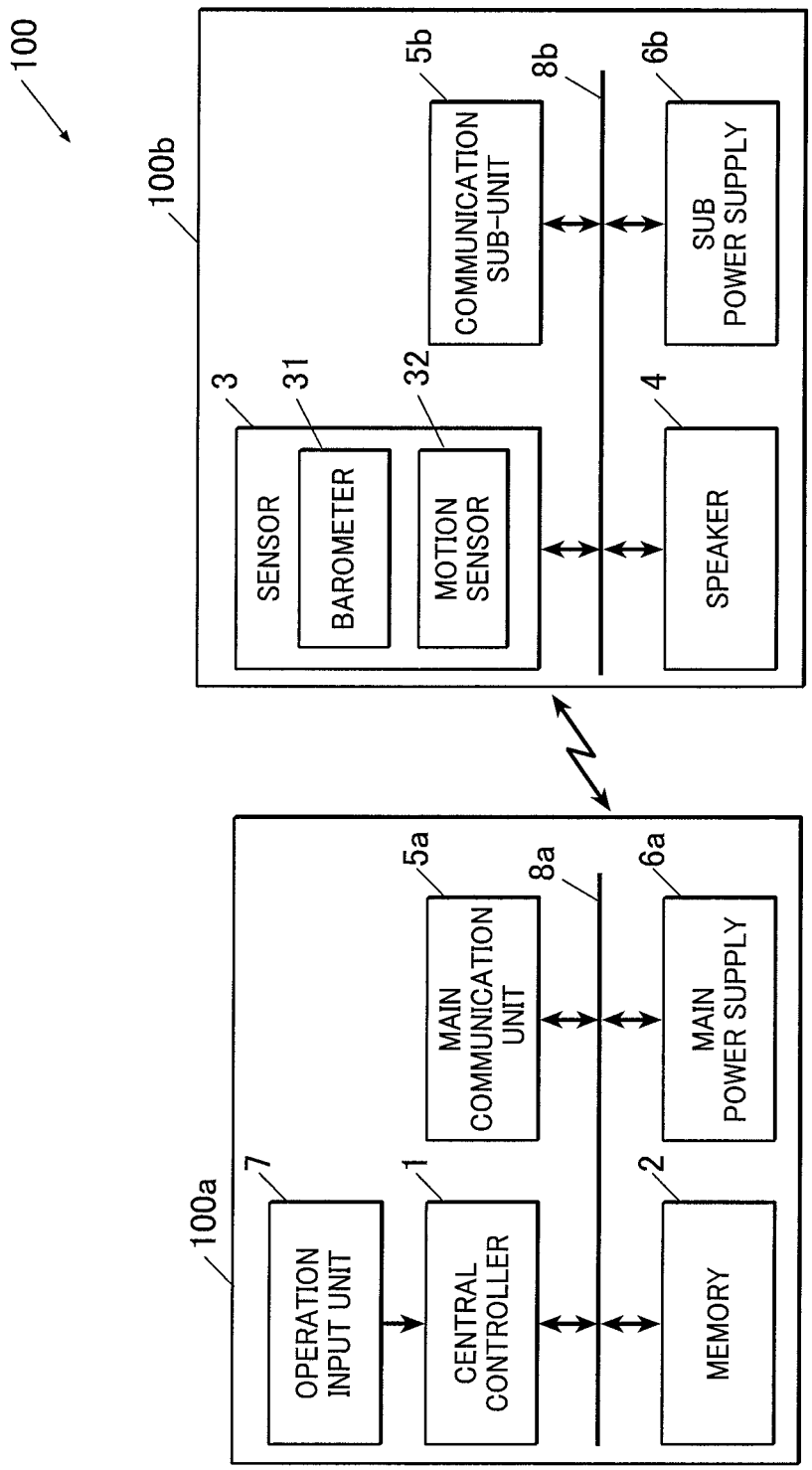
FIG. 4 is a block diagram illustrating an example functional configuration of the electronic device according to the first embodiment.

FIG. 4 is a block diagram illustrating a configuration of main control of the electronic device 100 according to this embodiment.

As show in FIG. 4, the main unit 100a includes a central controller 1, a memory 2, an operation input unit 7, a main communication unit 5a, and a main power supply 6a. The central controller 1, the memory 2, the main communication unit 5a, and the main power supply 6a are mutually connected via a bus line 8a.

As shown in FIG. 4, the subunit 100b includes a sensor 3, a speaker 4, a communication sub-unit 5b, and an auxiliary power supply 6b. The sensor 3, the speaker 4, the communication sub-unit 5b, and the auxiliary power supply 6b are mutually connected via a bus line 8b.

The central controller 1 comprehensively controls each component of the electronic device 100.

Specifically, the central controller 1 includes a central processing unit (CPU) which controls the components in the electronic device 100, a random access memory (RAM), and a read only memory (ROM) (all not shown). The central controller 1 controls of the components in accordance with various processing programs (not shown) for the electronic device 100.

The memory 2 includes, for example, a dynamic random access memory (DRAM) and temporarily stores data to be processed at the central controller 1 and other components of the electronic device 100.

The sensor 3 includes the barometer 31. The barometer 31 is arranged in the cavity 14a in the spacer 14, as described above. The barometer 31 determines an atmospheric pressure in the space A with a pressure-sensitive element via the diaphragm, converts the determined atmospheric pressure to an electrical signal, and outputs the signal to the central controller 1.

The sensor 3 further includes a motion sensor 32 that detects movement of the electronic device 100, such as a GPS receiver that can acquire positional information about the electronic device 100, a triaxial accelerometer, or a gyro sensor.

The speaker 4 includes a D/A converter (not shown), a speaker element (not shown), and a diaphragm (not shown). The D/A converter converts audio data to an analog signal in accordance with an instruction from the central controller 1; the diaphragm amplifies the analog audio signal to a predetermined volume; and the amplified signal is emitted to the outside of the electronic device 100 through the sound hole 11 as a tone.

The main communication unit 5a is a communication unit in accordance with near field communication standards, such as Bluetooth (registered trademark), and is in wireless communication with the communication sub-unit 5b of the subunit 100b. The main communication unit 5a receives data from the subunit 100b and outputs this data to an external information terminal, such as a smart phone, under the control of the central controller 1.

The communication sub-unit 5b is, for example, a communication unit in accordance with near field communication standards, such as Bluetooth (registered trademark), and is in wireless communication with the main communication unit 5a of the main unit 100a. The communication sub-unit 5b outputs data acquired by the sensor 3 to the main unit 100a under the control of the central controller 1.

In the case of the main unit 100a integrated with the subunit 100b, the communication sub-unit 5b may be omitted.

The main power supply 6a supplies electrical power at a predetermined voltage for operation of the main unit 100a. The main power supply 6a includes, for example, a battery of a certain type (such as a lithium battery or a nickel-metal hydride rechargeable battery).

The auxiliary power supply 6b supplies electrical power at a predetermined voltage for operation of the subunit 100b. The auxiliary power supply 6b includes, for example, a battery of a certain type (such as a lithium battery or a nickel-metal hydride rechargeable battery).

The operation input unit 7 includes a power button (not shown) for the ON/OFF of the power and a start/stop button (not shown) for start/stop of data acquisition. The central controller 1 controls the components in accordance with instructions from the operation input unit 7.

The subunit 100b further includes a light-emitting diode and/or a vibration motor (both not shown) for notification to the user and a packing as a waterproof member (not shown) that ensures waterproofness of the subunit 100b.

[Detection of State]

A method of detecting the state of the waterproof membrane 13 of the electronic device 100 according to this embodiment will now be explained. The term "state" in this embodiment includes the state of the waterproof membrane 13 and the state of the external environment of the electronic device 100.

The electronic device 100 according to this embodiment detects a change in the state of the electronic device 100 from a normal state to an abnormal state, notifies the user of the abnormal state of the electronic device 100, and prompts the user to resolve the abnormal state.

Examples of the abnormal state include "submergence of the electronic device 100 in water," "damage of the waterproof membrane 13," and "contamination of the waterproof membrane 13."

As described above, the barometer 31 of the electronic device 100 determines the atmospheric pressure in the space A to acquire the external pressure of the electronic device 100. Alternatively, the barometer 31 may detect the vibration of the air in the space A caused by the tone emerging from the speaker 4 as a variation in atmospheric pressure. At this time, the waterproof membrane 13, which vibrates together with the air, vibrates in different ways depending on the states of the waterproof membrane 13. Such a difference in the vibration of the waterproof membrane 13 can be detected by the barometer 31 in the form of a variable atmospheric pressure in the space A.

In a normal state, the electronic device 100 resides in the atmospheric air without any damage to the waterproof membrane 13. When the electronic device 100 is submerged in water, the hydraulic pressure applied to the waterproof membrane 13 is greater than the atmospheric pressure. Thus, the waterproof membrane 13 does not sufficiently vibrate in the submerged state, and the vibration pattern (i.e., characteristics in waveform, frequency, or acoustic pressure) of the air in the space A detected by the barometer 31 differs from that in the normal state.

The barometer 31 also detects a vibration pattern of the air in the space A different from that in the normal state when the waterproof membrane 13 is subjected to damage, such as a tear, or when the waterproof membrane 13 is contaminated, such as water drops or dust, because such damage or contamination varies the vibration of the waterproof membrane 13.

Thus, the electronic device 100 instructs the barometer 31 to detect the vibration of the air in the space A caused by a tone in four states: 1) a normal state of the electronic device 100 residing in an atmospheric air without contamination or damage to the waterproof membrane 13; 2) a submerged state of the electronic device 100 in water; 3) a contaminated state of the waterproof membrane 13, such as dust or water drops; and 4) a damaged state of the waterproof membrane 13. The detected results are saved as reference data sets.

The electronic device 100 controls the speaker 4 or sound outputting means to regularly or irregularly generate tones during normal use so as to detect the state of the electronic device 100. The barometer 31 or atmospheric-pressure detecting means detects the vibration pattern of air in the space A in response to the generated tones. The central controller 1 functions as an external-pressure calculating means and compares the data on the atmospheric pressure determined by the barometer 31 (hereinafter referred to as detected data) with the reference data sets. As a result, the abnormal state of the waterproof membrane 13 of the electronic device 100 is determined based on the similarity between the detected data and the reference data.

The detection of the abnormal state will now be described below in detail.

The central controller 1 controls the speaker 4 to output a tone for state detection. The acoustic waves of the tone for state detection have a frequency within the range of, for example, 40 to 50 kHz, which are a higher frequency inaudible to the user. The tone outputted from the speaker 4 vibrates the air in front of the speaker 4. The waterproof membrane 13 arranged in front of the speaker 4 vibrates together with air in the space A. The barometer 31 detects the vibration of the air in the space A as a variation in the atmospheric pressure, converts the detected results to electrical signals, and outputs the electrical signals to the central controller 1.

The central controller 1 extracts a characteristic waveform pattern from the electrical signals outputted from the barometer 31 and saves the extracted pattern in the memory 2. Reference data sets for the normal state, the submerged state, the damaged state, and the contaminated state may be acquired beforehand and thus stored in the memory 2.

The reference data of the normal state can be regularly updated. The central controller 1 controls the speaker 4 to regularly generate tones for state detection during normal use of the electronic device 100 and updates the reference data every time a tone is generated. The stored reference data is updated with newly acquired reference data, to maintain the accuracy of the reference data.

The detected data is compared with the reference data acquired as described above. The electronic device 100 controls the speaker 4 to regularly or irregularly generate tones for state detection during normal use. The barometer 31 detects the vibration of the air in the space A and outputs the detected data to the central controller 1. The central controller 1 extracts a characteristic waveform pattern (waveform, frequency, or acoustic pressure) from the electrical signals outputted from the barometer 31 and compares the extracted pattern with the reference data sets. As a result, the state of the electronic device 100 is determined based on the similarity between the reference data set and the detected data.

If the central controller 1 determines that the electronic device 100 is in an abnormal state, the central controller 1 functions as a notification controlling means and notifies the user of the abnormal state. The notification of the abnormal state may be, for example, light or vibration corresponding to the abnormal state emitted from a light-emitting diode or a vibration motor or a warning appearing on a screen of an information terminal such as a smart phone, connected via the main communication unit 5a and the communication sub-unit 5b.

When the electronic device 100 is in the submerged state, the motion sensor 32 cannot correctly detect the movement of the electronic device 100. Thus, the central controller 1 functions as a motion-sensor controlling means and stops the operation of the motion sensor 32.

The central controller 1 further functions as a controlling means and stops the operation of the barometer 31.

Figure 5:
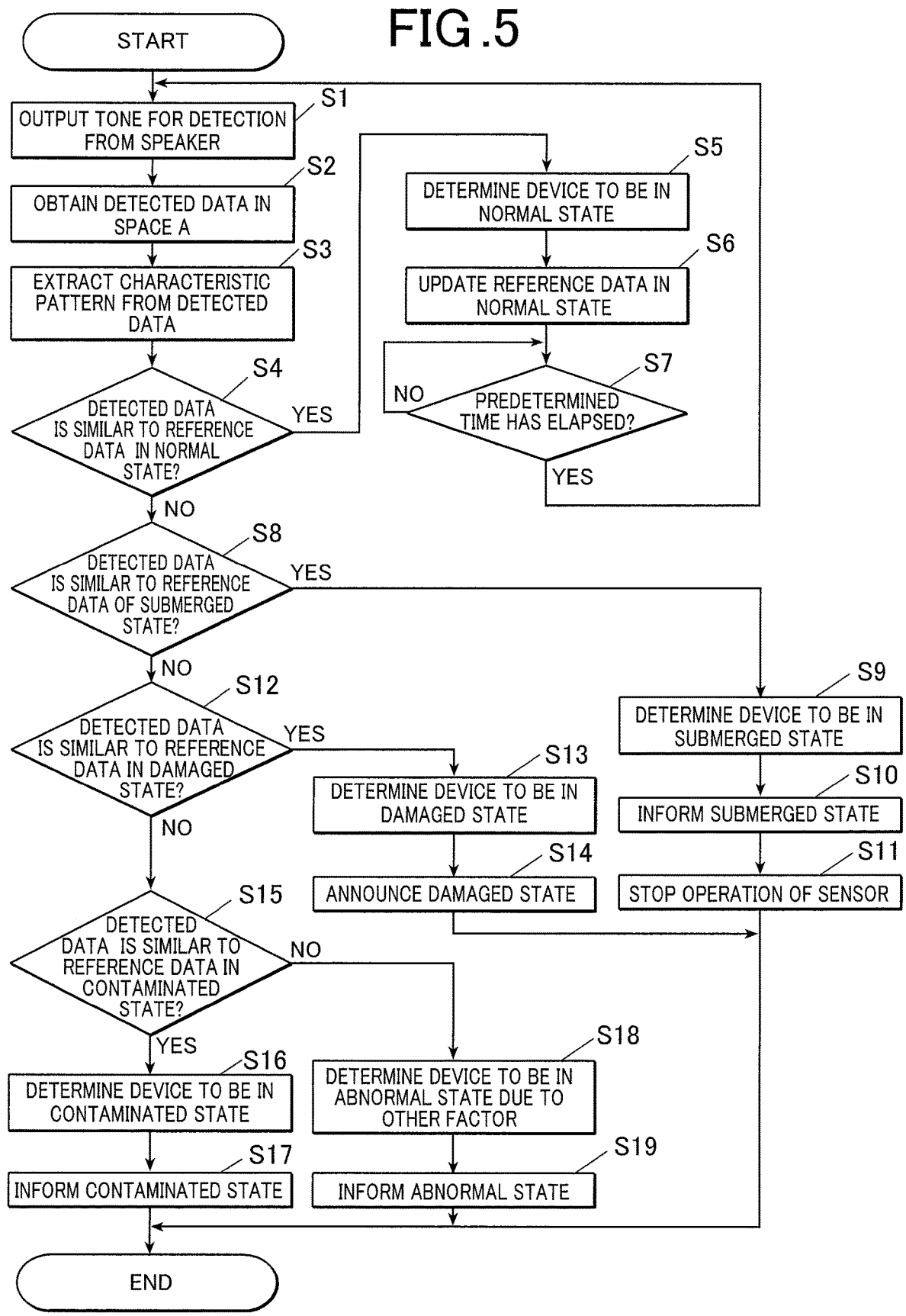
FIG. 5 is a flow chart illustrating an example operation of the electronic device detecting a change in a state of the subunit according to the first embodiment.

Referring to the flow chart in FIG. 5, the detection of the state of the electronic device 100 according to this embodiment will now be described.

During normal use of the electronic device 100, the central controller 1 controls the speaker 4 to output a tone for state detection (step S1).

The barometer 31 detects the vibration of the air in the space A caused by the tone as a variation in the atmospheric pressure, and the central controller 1 receives the detected data from the barometer 31 (step S2).

The central controller 1 extracts a characteristic pattern of the acoustic waves in the space A, such as waveform, frequency, or acoustic pressure, from the electrical signals acquired in step S2 (step S3).

The central controller 1 compares the characteristics of the detected data extracted in step S3 with the characteristics of the reference data of the normal state stored in the memory 2, to determine whether the detected data is similar to the reference data (step S4). If the detected data is similar to the reference data of the normal state (YES in step S4), the central controller 1 determines that the electronic device 100 is in the normal state (step S5).

The central controller 1 then updates the reference data of the normal state with the data detected in step S2 (step S6).

The central controller 1 then determines whether a predetermined time has elapsed (step S7). If a predetermined time has not elapsed (NO in step S7), then, step S7 is repeated; otherwise (YES in step S7) the process returns to step S1 to repeat the steps described above.

If the detected data is not similar to the reference data of the normal state in step S4 (NO in step S4), the central controller 1 determines whether the detected data is similar to the reference data of the submerged state (step S8). If the detected data is similar to the reference data of the submerged state (YES in step S8), the central controller 1 determines that the electronic device 100 is in the submerged state (step S9).

The central controller 1 then controls the light-emitting diode and/or the vibration motor to notify the user of the submerged state of the electronic device 100 or controls the main communication unit 5a to notify an external device of the submerged state (step S10). The central controller 1 then stops the operations of the barometer 31 and the motion sensor 32 of the sensor 3 (step S11) and completes the control.

If the detected data is not similar to the reference data of the submerged state in step S8 (NO in step S8), the central controller 1 compares the detected data with the reference data of the damaged state (step S12). If the detected data is similar to the reference data of the damaged state (YES in step S12), the central controller 1 determines that the waterproof membrane 13 is in the damaged state (step S13).

The central controller 1 then controls the light-emitting diode and/or the vibration motor to notify the user of the damaged state of the waterproof membrane 13 or controls the main communication unit 5a to notify an external device of the damaged state (step S14) and completes the control.

If the detected data is not similar to the reference data of the damaged state in step S12 (NO in step S12), the central controller 1 compares the detected data with the reference data of the contaminated state (step S15). If the detected data is similar to the reference data of the contaminated state (YES in step S15), the central controller 1 determines that the waterproof membrane 13 is in the contaminated state (step S16).

The central controller 1 then controls the light-emitting diode and/or the vibration motor to notify the user of the contaminated state of the waterproof membrane 13 or the main communication unit 5a to notify an external device of the contaminated state (step S17) and completes the control.

If the detected data is not similar to the reference data of the contaminated state in step S15 (NO in step S15), the central controller 1 determines that the abnormal state is caused by some other factor (step S18), controls the light-emitting diode or the vibration motor to notify the user of the abnormal state or the main communication unit 5a to notify an external device of the contaminated state (step S19), and then completes the control.

As described above, the electronic device 100 according to this embodiment includes a housing 10 having an opening (e.g., the sound hole 11) waterproofed with a waterproof member (e.g., the waterproof membrane 13); a data outputting means (e.g., the barometer 31) arranged in the housing 10 and and configured to output data that varies depending on the state of the waterproof member; and a state detecting means (e.g., the central controller 1) detecting an abnormal state of the waterproof member based on the data outputted from the data outputting means. By way of this, an abnormal state of the waterproof member can be detected.

The data outputting means is a barometer 31 that is arranged in the housing 10, determines the atmospheric pressure in the internal space of the housing 10, and outputs the determined results. The electronic device 100 includes a speaker 4 arranged inside the housing 10 and configured to output sound; and a waterproof membrane 13 configured to partition the internal space and the external space of the housing 10 and vibrate in response to the sound from the speaker 4. The state-detecting means detects an abnormal state of the waterproof membrane 13 at the time when the speaker 4 is outputting a sound based on the atmospheric pressure data determined by the barometer 31 corresponding to the variation in the vibration of the waterproof membrane 13. The electronic device 100 includes a known barometer 31 and a known speaker 4 to detect the state of the electronic device 100. Thus, the electronic device 100 can be produced economically without any extra cost.

The speaker 4 outputs an inaudible sound. Thus, the user of the electronic device 100 may not be bothered even if such tones are generated regularly or irregularly.

The state detecting means detects an abnormal state of the waterproof membrane 13 based on the difference between the atmospheric pressure data determined by the barometer 31 and the reference data, which is the atmospheric pressure data determined by the barometer 31 at the time when the speaker 4 is outputting a sound while the waterproof membrane 13 is being in the normal state. Detection of the state based on highly reliable reference data reduces a risk of erroneous detection of the state, and thus an abnormal state can be certainly detected.

The state detecting means detects at least one of change in environment of the housing 10 from atmospheric air to under water, damage to the waterproof membrane 13, and contamination of the waterproof membrane 13. Immediate detection of a state that hinders the normal functions of the electronic device 100 enables the user to efficiently use the electronic device 100.

The electronic device 100 includes an external-pressure calculating means (central controller 1) that calculates the external pressure surrounding the housing 10 based on atmospheric pressure data determined by the barometer 31; and a controlling means (central controller 1) that controls the calculation of the external pressure by the external-pressure calculating means. The controlling means stops the calculation of the external pressure by the external-pressure calculating means when an abnormal state of the waterproof member is detected by the state detecting means. As a result, the barometer 31 is not activated under circumstances in which the atmospheric pressure cannot accurately be detected, resulting in reduced power consumption.

The controlling means stops the calculation of the external pressure by the external-pressure calculating means at the time when the speaker 4 is outputting a sound. Thus, a variation in the atmospheric pressure due to a tone for detection is not erroneously detected as a variation in the external pressure.

The electronic device 100 further includes a notification controlling means (central controller 1) that notifies the user of an abnormal state of the waterproof membrane 13. Thus, the user can readily know the abnormal state of the electronic device 100.

The electronic device 100 includes a motion sensor 32, arranged in the housing 10, that outputs a sensor signal corresponding to the movement of the housing 10; and a motion-sensor controlling means (central controller 1) that controls the operation of the motion sensor 32. The motion-sensor controlling means stops the operation of the motion sensor 32 when the state detecting means detects the change in environment of the housing 10 from atmospheric air to water. As a result, the motion sensor 32 is not activated under circumstances in which the movement of the electronic device 100 cannot accurately be detected, resulting in reduced power consumption.

In the embodiment described above, examples of the abnormal states: of the electronic device 100 being submerged in water; of the waterproof membrane 13 being damaged; and of the waterproof membrane 13 being contaminated with foreign substances are described, but are not limited to. For example, the abnormal state may be determined in a case where the external pressure exceeds a threshold of the external pressure allowable for the electronic device 100. In such a case, the vibration of the waterproof membrane 13 varies in response to the high pressure applied to the waterproof membrane 13, as in the submerged state, and thus, the variation in the vibration of the air can be detected.

In the submerged state of the electronic device 100, high pressure is applied to the entire housing 10, resulting in a significant variation in the atmospheric pressure determined by the barometer 31. Thus, the submerged state can be detected even without tones outputted from the speaker 4. Thus, in a case where sudden change of the pressure applied to the waterproof membrane 13 is detected, controlling of notification of the submerged state may be performed in the same manner as the embodiment as described above.

Second Embodiment

[Configuration of Electronic Device]

An electronic device 200 according to the second embodiment will now be described.

The following embodiments would be provided with technically-preferred various limitations for accomplishing the present invention. The scope of the invention, however, should not be limited to the embodiments and drawings. Components having the same configurations as those according to the first embodiment are indicated by the same reference signs, and descriptions thereof are not repeated.

Figure 6:
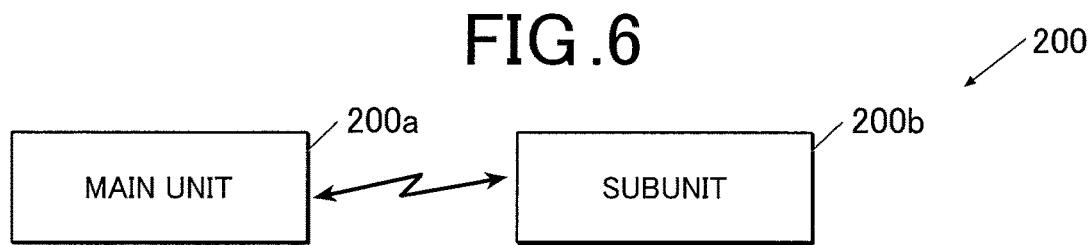
FIG. 6 illustrates an electronic device according to a second embodiment of the present invention.

FIG. 6 illustrates a configuration of an electronic device 200 according to the second embodiment.

With reference to FIG. 6, the electronic device 200 includes a main unit 200a and a subunit 200b. The main unit 200a is an external information terminal, such as a smart phone. The main unit 200a is in wireless communication with the subunit 200b. The subunit 200b may be connected to an external device, such as a personal computer, through a USB. Alternatively, the subunit 200b may exchange data with a detachable memory card containing the data from the external device. The main unit 200a may be integrated with the subunit 200b as in a wearable activity tracker. The integrated units may establish data communication with an external device via a USB or a memory card, for example.

In this embodiment, the main unit 200a and the subunit 200b are separate components in wireless communication with each other.

Figure 7A:
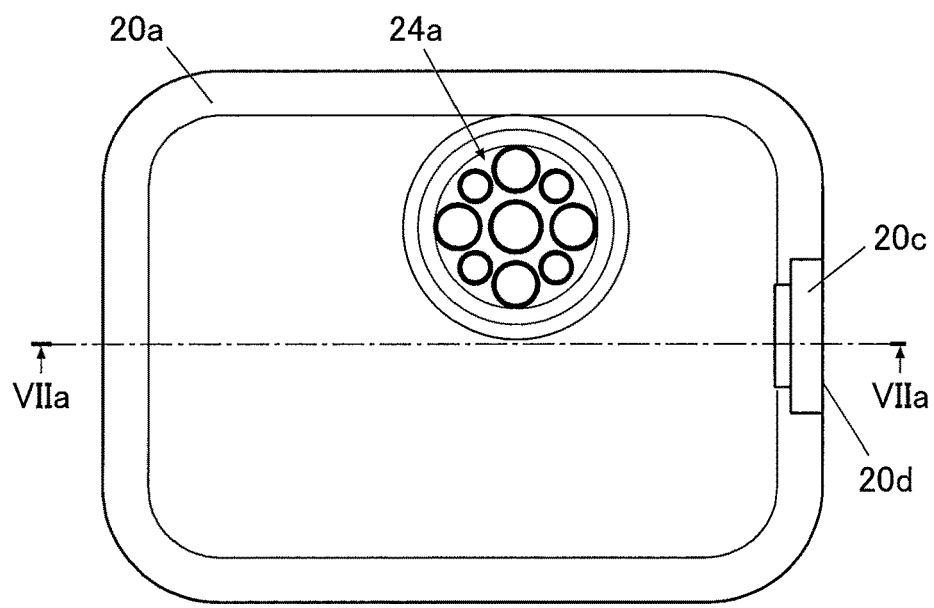
FIG. 7A is a front view of a configuration of a subunit according to the second embodiment.
Figure 7B:
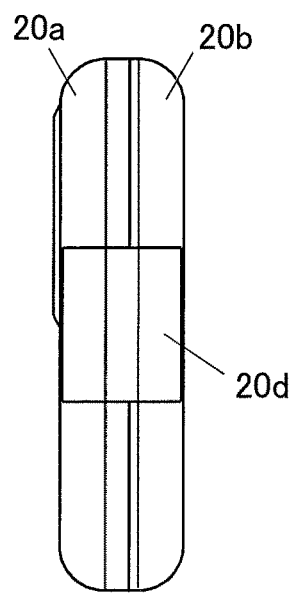
FIG. 7B is a side view of the configuration of the subunit according to the second embodiment.

FIGS. 7A and 7B are external views of the subunit 200b, where FIG. 7A is a front view, and FIG. 7B is a side view.

Figure 8:
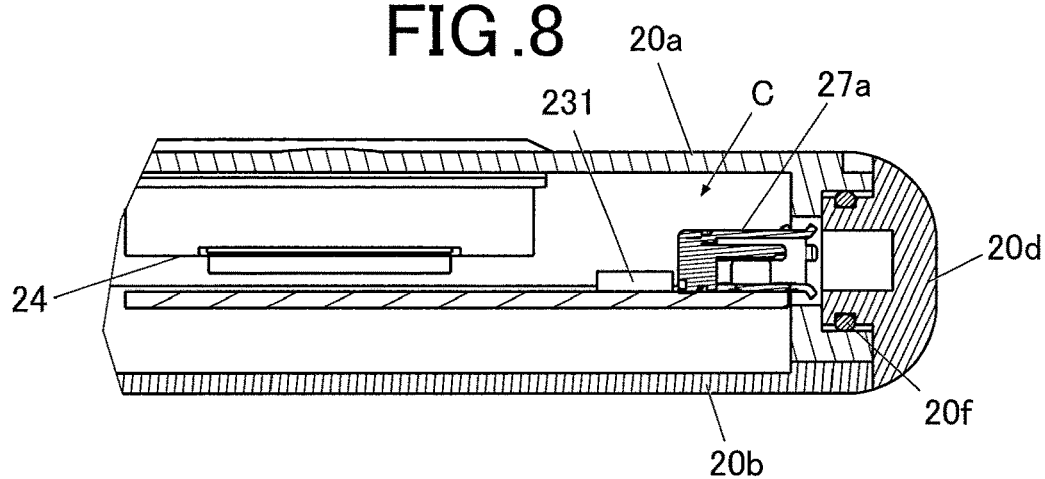
FIG. 8 is a cross-sectional view of the subunit according to the second embodiment.
Figure 9:
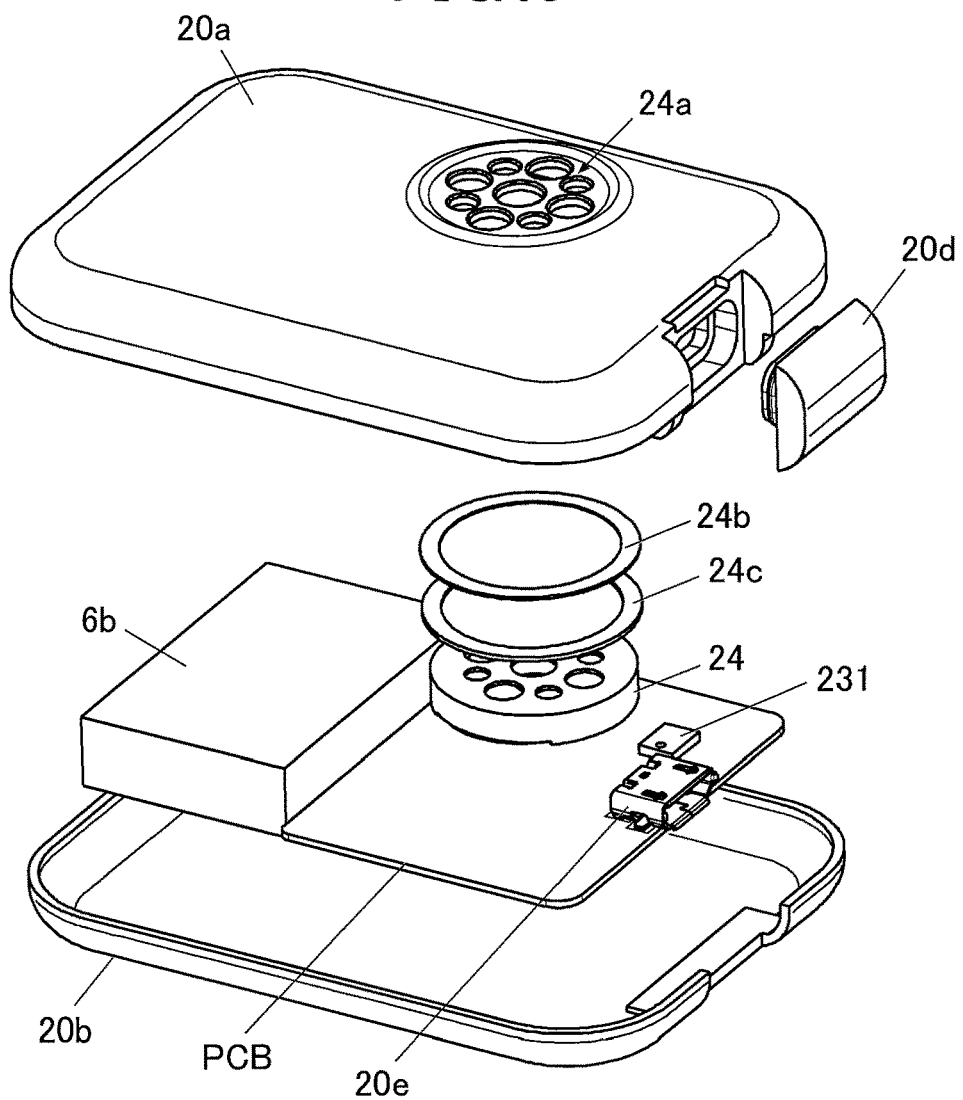
FIG. 9 is an exploded view of the disassembled subunit according to the second embodiment.

FIG. 8 is a cross-sectional view of the subunit 200b taken along line VIIa-VIIa in FIG. 7A. FIG. 9 is an exploded view of the disassembled state of the subunit 200b.

As shown in FIG. 7A, the subunit 200b includes a housing 20 including a front member 20a and a rear member 20b; and a connector cover 20d configured to cover an opening 20c formed on portions of the front member 20a and the rear member 20b for receiving a USB cable into the housing 20, and to be attachable to and detachable from the housing 20 or to be openable and closable. When the connector cover 20d closes to cover the opening 20c, the connector cover 20d functions as a waterproof member that ensures the waterproofness of the housing 20.

The front member 20a has sound holes 24a that allow passage of tones outputted from a speaker 24 toward the exterior of the housing 20. Further, a protective member 24b and a waterproof membrane 24c which protect the components in the housing 20 are provided at the inner side of the sound holes, in this order from the outer side. These components are fixed with a double-sided tape or an adhesive agent that ensures waterproofness and airtightness. The front member 20a is fixed to the rear member 20b with one or more screws (not shown).

As shown in FIG. 9, in the subunit 200b, components, such as a barometer 231, a speaker 24, an auxiliary power supply 6b, a USB connector 20e, and a printed circuit board PCB are arranged.

The speaker 24 includes a diaphragm that faces the rear member 20b and propagates a tone to a space C defined by the front member 20a, the rear member 20b, and the connector cover 20d.

The speaker 24 functions as a sound outputting means.

The USB connector 20e is provided inside the opening 20c and connects the USB cable and the subunit 200b. A waterproof packing 20f that ensures waterproofness and airtightness is arranged on a contact face of the connector cover 20d and the front member 20a and the rear member 20b in the opening 20c.

The auxiliary power supply 6b is a chargeable battery arranged inside the housing 20 to supply electrical power at a predetermined voltage for operation of the subunit 200b.

The barometer 231 is arranged on the printed circuit board PCB. The barometer 231 includes a flexible printed circuit board (FPC) (not shown) and is fixed to the printed circuit board PCB with a double-sided tape or an adhesive agent. That is, the barometer 231 determines the atmospheric pressure in the space C, which is a semi-enclosed space.

The barometer 231 functions as an atmospheric-pressure detecting means and a data outputting means.

Figure 10:
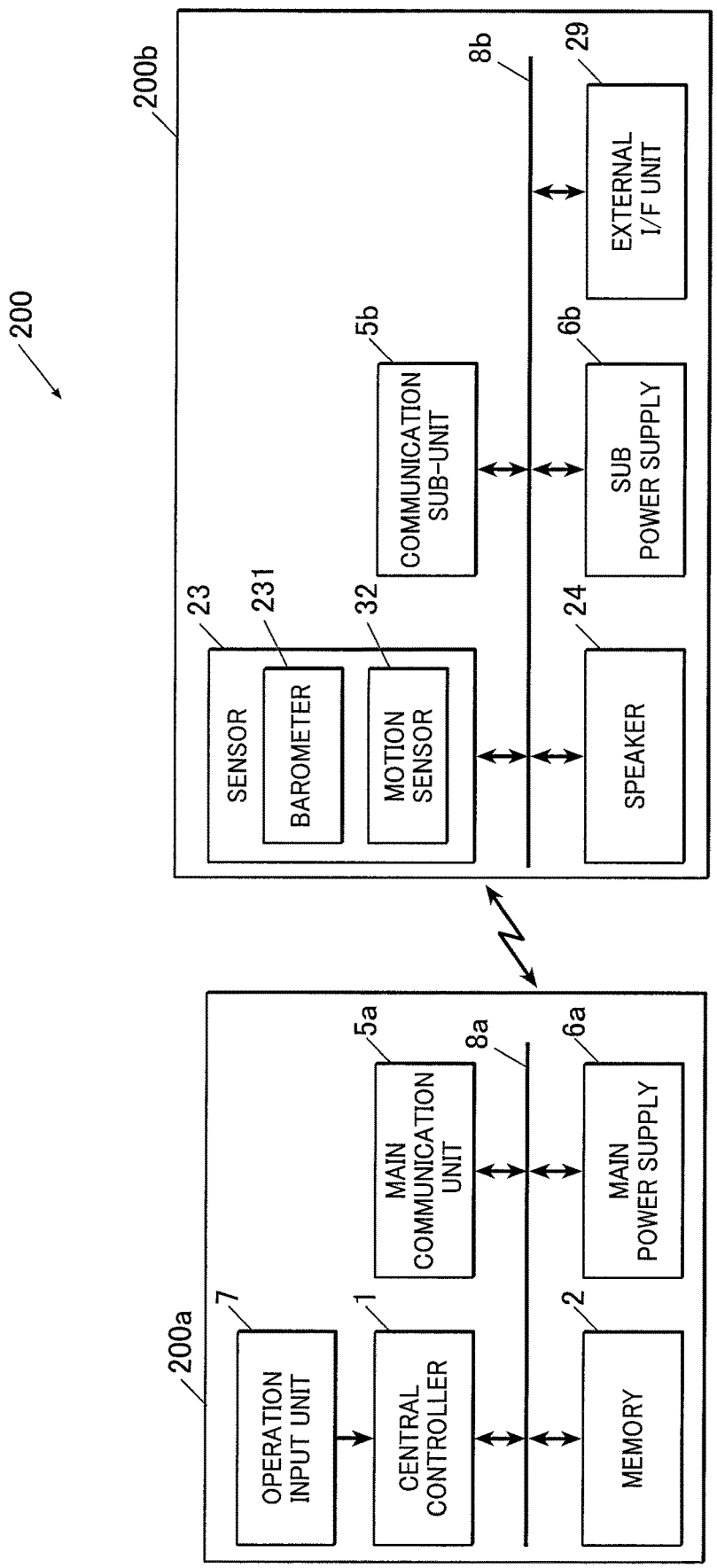
FIG. 10 is a block diagram illustrating an example functional configuration of the electronic device according to the second embodiment.

FIG. 10 is a block diagram illustrating a configuration of main control of the electronic device 200 according to this embodiment.

As shown in FIG. 10, the main unit 200a includes a central controller 1, a memory 2, an operation input unit 7, a main communication unit 5a, and a main power supply 6a. The central controller 1, the memory 2, the main communication unit 5a, and the main power supply 6a are mutually connected via a bus line 8a.

As shown in FIG. 10, the subunit 200b includes a sensor 23, a speaker 24, a communication sub-unit 5b, an auxiliary power supply 6b, and an external I/F unit 29. The sensor 23, the speaker 24, the communication sub-unit 5b, the auxiliary power supply 6b, and the external I/F unit 29 are mutually connected via a bus line 8b.

The sensor 23 includes a barometer 231 and a motion sensor 32. The barometer 231 is arranged on the printed circuit board PCB as described above, determines the atmospheric pressure in the space C with a pressure-sensitive element via a diaphragm, converts the determined atmospheric pressure to electrical signals, and outputs the signals to the central controller 1.

The speaker 24 includes a D/A converter (not shown), a speaker element (not shown), and a diaphragm (not shown). The D/A converter converts audio data to analog signals in accordance with an instruction from the central controller 1; the diaphragm amplifies the analog audio signals to a predetermined volume; and the sound holes 24a propagate a tone toward the exterior of the electronic device 200.

The external I/F unit 29 includes the USB connector 20e connected to a cable. The external I/F unit 29 establishes data communication between the subunit 200b and an external device, such as a personal computer, via the cable connected to the USB connector 20e.

Alternatively, the external I/F unit 29 may be configured to allow for exchanging data between the subunit 200b and an external device through a detachable memory card.

The subunit 200b further includes a light-emitting diode and/or a vibration motor (both not shown) for notification to the user and a waterproof member or a packing (not shown) that ensures the waterproofness of the subunit 200b.

[Detection of State]

A method of detecting a state of the electronic device 200 according to this embodiment will now be explained.

The electronic device 200 according to this embodiment detects change in the state of the electronic device 200 from a normal state to an abnormal state, notifies the user of the abnormal state of the electronic device 200, and prompts the user to resolve the abnormal state.

In this example, an abnormally-closed state of the opening 20c to be covered by the connector cover 20d, such as "complete detachment of the connector cover 20d from the opening 20c" and "incomplete attachment of the connector cover 20d to the opening 20c."

The barometer 231 can also detect the vibration of the air in the space C caused by a tone emerging from the speaker 24, as a variation in atmospheric pressure. In the abnormally-closed state of the connector cover 20d, the tone leaks to the exterior of the electronic device 200, and accordingly the atmospheric pressure in the space C determined by the barometer 231 decreases.

Thus, the electronic device 200 instructs the barometer 231 to detect the vibration of the air in the space C caused by a tone in a normal state (in which the connector cover 20d is completely attached to the opening 20c) and in an abnormal state (in which the connector cover 20d is detached from the opening 20c or incompletely attached to the opening 20c), and then holds the detected state as reference data.

The central controller 1 controls the speaker 24 or sound outputting means to regularly or irregularly generate tones during normal use so as to detect the state of the electronic device 200. The barometer 231, which functions as atmospheric-pressure detecting means, sends the detected data to the central controller 1, and the central controller 1 detects the vibration pattern of air in the space C in response to the generated tones. The central controller 1, which functions as an external-pressure calculating means, compares the data on the atmospheric pressure determined by the barometer 231 (hereinafter referred to as detected data) with the reference data. If the atmospheric pressure in the detected data is lower than the atmospheric pressure in the reference data, the central controller 1 determines that the electronic device 200 is in an abnormal state.

The acoustic wave of the tone for state detection has a frequency within a range of, for example, 40 to 50 kHz, which is higher frequency inaudible to the user.

With reference to the flow chart in FIG. 11, detection of the state of the electronic device 200 according to this embodiment will now be described.

Once operation of the electronic device 200 starts in normal use, the central controller 1 controls the speaker 24 to output a tone for state detection (step S21).

The barometer 231 detects vibration of the air in the space C caused by the tone as variation in the atmospheric pressure and sends the detected data to the central controller 1, and the central controller obtains the detected data (step S22).

The central controller 1 then compares characteristics of the data detected in step S22 with characteristics of the reference data of the normal state stored in the memory 2, and determines whether the detected data is smaller than the reference data, i.e., whether the atmospheric pressure in the space C of the detected data is lower than the atmospheric pressure in the normal state (step S23). If the detected data is smaller than the reference data (YES in step S23), the central controller 1 determines that the electronic device 200 is in the normal state (step S24).

The central controller 1 then updates the reference data of the normal state with the data detected in step S22 (step S25).

The central controller 1 then determines whether a predetermined time has elapsed (step S26). If the predetermined time has not elapsed (NO in step S26), then, step S26 is repeated; otherwise (YES in step S26), the process returns to step S21 to repeat the process described above.

If the detected data is not smaller than the reference data in step S23 (NO in step S23), the central controller 1 determines that the electronic device 200 is in an abnormal state (step S27).

The central controller 1 then controls the light-emitting diode and/or the vibration motor to notify the user of the abnormal state (step S28) and completes the control.

As described above, the electronic device 200 according to this embodiment includes a housing 20 having an opening 20c that is waterproof member with a waterproof member (e.g., the connector cover 20d); a data outputting means (e.g., the barometer 231), arranged in the housing 20, that outputs data which varies depending on the state of the waterproof member (attached to the opening 20c or detected from the opening 20c); and a state detecting means (e.g., the central controller 1) that detects an abnormal state of the waterproof member (a state in which the connector cover 20d is detached from the opening 20c) based on the data outputted from the data outputting means. In this way, the abnormal state of the waterproof member can be detected, and the circuit board and other components inside the housing 20 can be prevented from being damaged due to intrusion of water to the interior of the housing 20.

The data outputting means is a barometer 231, arranged in the housing 20, that determines the atmospheric pressure in the internal space of the housing 20, and outputs the detected results. The electronic device 200 further includes a speaker 24, arranged in the housing 20, which outputs sound; and a connector cover 20d that covers and uncovers the opening 20c, partitioning the internal space and the external space of the housing 20 and defining a space C inside the housing 20 to propagate the sound from the sound outputting means. The state-detecting means determines whether the connector cover 20d is detached from the housing 20 at the time when the speaker 24 is outputting a sound based on the atmospheric pressure data determined by the atmospheric-pressure detecting means depending on the state of the opening 20c covered or uncovered by the connector cover 20d. Thus, any extra cost is unnecessary for manufacturing the electronic device 200, thereby bringing economical advantage.

Although, in the embodiment described above, the speaker 24 regularly or irregularly generates tones for detection, preferably, timing of the tone may be selected so that variations in the atmospheric pressure can be ignored. For example, a situation the timing in which negligible movement is occurring in the electronic device 200 may be selected. Alternatively, a situation in which, as a result of completion of positioning by a GPS receiver, it is decided by the central controller 1 that the electronic device 200 is most likely positioned outside may be selected. It may be also an effective way to generate the tones in a situation in which the connector cover 20d is probably detached, such as when a predetermined time elapses after the USB cable is detached from the USB connector or after the electronic device is powered on.

Preferably, the tone for detection outputted from the speaker 24 may include two or more frequencies in view of enhancement of accuracy of detection. Tones with different frequencies may be generated at different times or at the same time (i.e., two or more tones may be mixed). Preferably, the reference data may include multiples reference data sets depending on different atmospheric pressures in a situation in which the opening 20c is covered with the connector cover 20d.

Other Embodiments

The embodiments of the present invention have been described in detail above. The embodiments, however, should not be limited to those described above.

For example, in the embodiment described above, the barometer 31 or the barometer 231 detects vibration of air, but not limited to. For example, a microphone may be used to detect a variation in the waveform of sound waves in a predetermined space.

The embodiments described above should not be construed to limit the present invention, and the claims and other equivalents thereof are included in the scope of the invention.

What is claimed is:

1. An electronic device comprising:
    a housing having an opening, the opening having a structure to be waterproofed with a waterproof member comprising a waterproof membrane that partitions an internal space and an external space of the housing;
    a data output unit arranged in the housing, wherein the data output unit detects a change depending on a state of the waterproof member and outputs data caused by the detection;
    a sound outputting unit arranged in the housing;
    a processor; and
    a storage unit which stores a program to be executed by the processor,
    wherein the processor performs, in accordance with the program stored in the storage unit,
        a state detection process for detecting, as an abnormal state of the waterproof member, damage to the waterproof membrane or contamination of the waterproof membrane with a foreign substance based on the data outputted by the data output unit, and
        a notification control process of instructing a notifying unit to notify a user of the damage to the waterproof membrane or the contamination of the waterproof membrane with the foreign substance,
    wherein the data output unit comprises an atmospheric-pressure detecting unit, arranged in the housing, which determines an atmospheric pressure in the internal space of the housing, and outputs the determined atmospheric pressure,
    wherein the waterproof membrane vibrates in response to a sound outputted from the sound outputting unit, and
    wherein the state detection process includes detecting the abnormal state of the waterproof membrane based on data on the atmospheric pressure in the internal space of the housing determined by the atmospheric-pressure detecting unit at the time when the sound outputting unit is outputting a sound, the atmospheric pressure varying in response to vibration of the waterproof membrane,
    wherein the electronic device has (i) first reference data that is data on an atmospheric pressure determined by the atmospheric-pressure detecting unit at the time when the sound outputting unit is outputting a sound in a state where the waterproof membrane is damaged and (ii) second reference data that is data on an atmospheric pressure determined by the atmospheric-pressure detecting unit at the time when the sound outputting unit is outputting a sound in a state where the waterproof membrane is contaminated with the foreign substance, and
    wherein the state detection process includes:
        comparing the data on the atmospheric pressure determined by the atmospheric-pressure detecting unit with each of the first reference data and the second reference data, and
        determining whether the waterproof membrane is damaged or contaminated with the foreign substance based on similarity between the data on the atmospheric pressure determined by the atmospheric-pressure detecting unit and each of the first reference data and the second reference data.

2. The electronic device according to claim 1, further comprising a member arranged in the housing and configured to be unable to serve regular function in the abnormal state of the waterproof member.

3. The electronic device according to claim 1, wherein the state detection process includes detecting the abnormal state of the waterproof member based on a difference between data outputted by the data output unit and reference data, the reference data being data outputted by the data output unit in a normal state of the waterproof member.

4. The electronic device according to claim 1,
    wherein the data output unit comprises an atmospheric-pressure detecting unit, arranged in the housing, which determines the atmospheric pressure in an internal space of the housing and outputs the determined atmospheric pressure, and
    wherein the state detection process includes detecting the abnormal state of the waterproof member based on atmospheric pressure data outputted by the atmospheric-pressure detecting unit.

5. The electronic device according to claim 4,
    wherein the processor executes
        an external-pressure calculation process of calculating the external pressure of the housing based on the atmospheric pressure data determined by the atmospheric-pressure detecting unit, and
        a control process of controlling the calculation of the external pressure in the external-pressure calculation process, and
    wherein the control process includes stopping the calculation of the external pressure in the external-pressure calculation process in a case where the abnormal state of the waterproof member is detected in the state detection process.

6. The electronic device according to claim 5, further comprising a sound outputting unit arranged in the housing,
    wherein the control process includes stopping the calculation of the external pressure in the external-pressure calculation process at the time when the sound outputting unit is outputting a sound.

7. The electronic device according to claim 1, further comprising a motion sensor, provided in the housing, which outputs a sensor signal depending on the movement of the housing,
    wherein the processor executes a motion-sensor control process of controlling operation of the motion sensor,
    wherein the state detection process includes detecting change in environment of the housing from atmospheric air to under water as the abnormal state of the waterproof member, and
    wherein the motion-sensor control process stopping the operation of the motion sensor in a case where the change in environment of the housing from atmospheric air to under water is detected in the state detection process.

8. The electronic device according to claim 1,
wherein the waterproof member comprises an opening/closing member for switching between an open state and a closed state of the opening, and
wherein the state detecting process includes detecting an abnormally-closed state of the opening as the abnormal state of the waterproof member.

9. The electronic device according to claim 8, further comprising a sound outputting unit arranged in the housing,
wherein the data outputting unit comprises an atmospheric-pressure detecting unit, arranged in the housing, which determines the atmospheric pressure in the internal space of the housing, and outputs the determined atmospheric pressure,
wherein the opening/closing member partitions the internal space and the external space of the housing and defines a subspace in the internal space of the housing for propagation of a sound outputted from the sound outputting unit when the opening/closing member covers the opening, and
wherein the state detection process includes detecting the abnormally-closed state of the opening based on data regarding the atmospheric pressure in the subspace for propagation of the sound, the atmospheric pressure being determined by the atmospheric-pressure detecting unit and varying depending on the open or closed state of the opening by the opening/closing member at the time when the sound outputting unit is outputting a sound.

10. The electronic device according to claim 9,
wherein the state detection process includes detecting the abnormally-closed state of the opening based on the difference between data on the atmospheric pressure determined by the atmospheric-pressure detecting unit and reference data, the reference data being data on the atmospheric pressure determined by the atmospheric-pressure detecting unit at the time when the sound outputting unit is outputting a sound in a closed state of the opening by the opening/closing member.

11. The electronic device according to claim 1, wherein the sound outputting unit outputs an inaudible sound.

12. The electronic device according to claim 9, wherein the sound outputting unit outputs an inaudible sound.

13. An electronic device comprising:
a housing having an opening, the opening having a structure to be waterproofed with a waterproof member comprising a waterproof membrane that partitions an internal space and an external space of the housing;
a data output unit arranged in the housing, wherein the data output unit detects a change depending on a state of the waterproof member and outputs data caused by the detection;
a processor; and
a storage unit which stores a program to be executed by the processor,
wherein the processor performs, in accordance with the program stored in the storage unit,
    a state detection process for detecting, as an abnormal state of the waterproof member, damage to the waterproof membrane or contamination of the waterproof membrane with a foreign substance based on the data outputted by the data output unit, and
    a notification control process of instructing a notifying unit to notify a user of the damage to the waterproof membrane or the contamination of the waterproof membrane with the foreign substance,
wherein the data output unit comprises an atmospheric-pressure detecting unit, arranged in the housing, which determines the atmospheric pressure in an internal space of the housing and outputs the determined atmospheric pressure,
wherein the state detection process includes detecting the abnormal state of the waterproof member based on atmospheric pressure data outputted by the atmospheric-pressure detecting unit,
wherein the processor performs:
    an external-pressure calculation process of calculating the external pressure of the housing based on the atmospheric pressure data determined by the atmospheric-pressure detecting unit, and
    a control process of controlling the calculation of the external pressure in the external-pressure calculation process,
wherein the control process includes stopping the calculation of the external pressure in the external-pressure calculation process in a case where the abnormal state of the waterproof member is detected in the state detection process,
wherein the electronic device further comprises
    a sound outputting unit arranged in the housing,
    wherein the control process includes stopping the calculation of the external pressure in the external-pressure calculation process at the time when the sound outputting unit is outputting a sound, and
wherein the sound outputting unit outputs an inaudible sound.

* * * * *